E. RIVEROLL.
METHOD FOR THE PRODUCTION OF IRON AND STEEL.
APPLICATION FILED MAY 11, 1920.
1,391,507.  Patented Sept. 20, 1921.
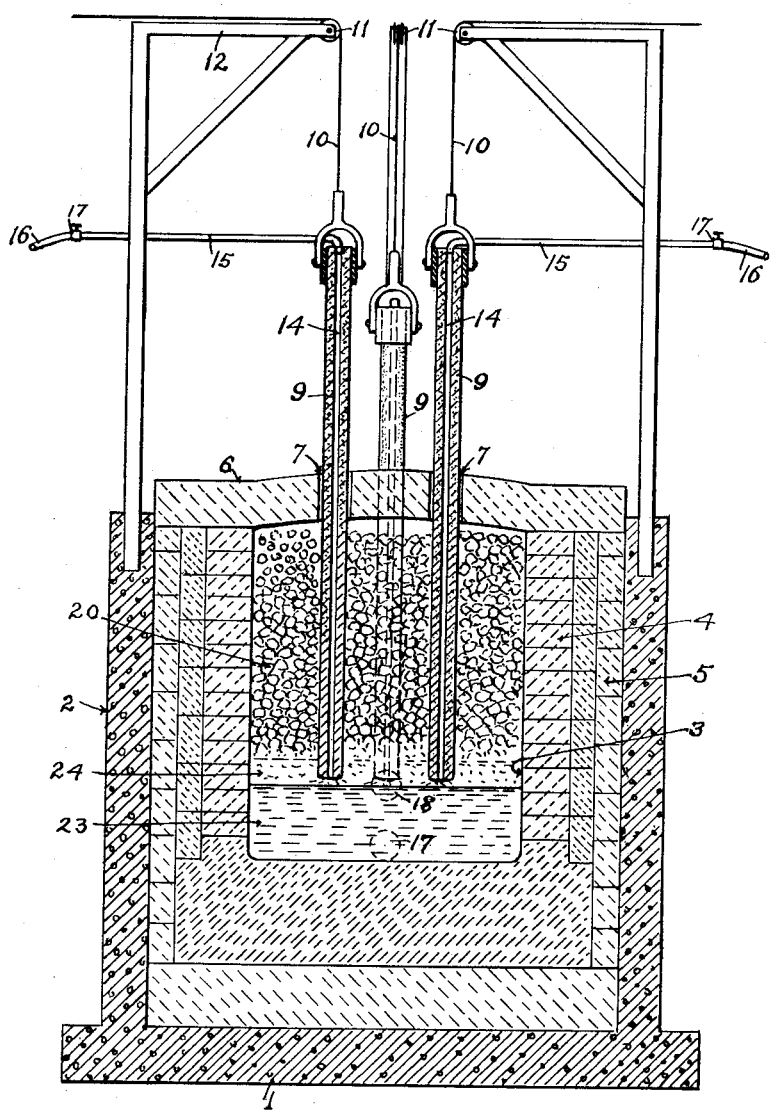
INVENTOR:
Elfego Riveroll.
BY Arthur P. Knight
ATTORNEY.

UNITED STATES PATENT OFFICE.

ELFEGO RIVEROLL, OF LOS ANGELES, CALIFORNIA.

METHOD FOR THE PRODUCTION OF IRON AND STEEL.

1,391,507.   Specification of Letters Patent.   Patented Sept. 20, 1921.

Application filed May 11, 1920. Serial No. 380,552.

*To all whom it may concern:*

Be it known that I, ELFEGO RIVEROLL, a citizen of the United States, residing at Los Angeles, in the county of Los Angeles and State of California, have invented a new and useful Method for the Production of Iron and Steel, of which the following is a specification.

This invention relates to the production of iron or steel by electrical smelting. The invention is particularly intended for electrical smelting of iron sponge produced by reduction of iron or steel at a temperature bel<sub>o</sub>w the melting point and in such manner as to produce a sponge containing iron in only partially reduced condition, the present invention being especially adapted for the completion of the reduction and melting of the iron to produce iron or steel in commercial form. The invention is, however, applicable also to the treatment of various ores of iron, or other metals.

The accompanying drawing is a vertical section of a furnace adapted for carrying out my invention.

The furnace shown in the drawing comprises a casing of concrete, or other suitable material, formed with a bottom 1 and vertically extending side walls 2 so as to provide a furnace chamber, crucible or receptable 3, which is surrounded by a lining 4 of suitable refractory material. An insulating layer 5 may be provided between the refractory lining 4 and the walls 2. A cover or top 6 for the furnace is provided extending over the crucible or receptacle 3 and closing same at the top, said cover being provided with openings or passages 7 through which pass the electrodes of the electric furnace. The furnace is here shown as of the three-phase type, having three electrodes 9, which are supported by suitable means, for example, by cables 10, extending over pulleys 11 on suitable supports 12 and connected to any suitable means for operating the cables to control the height of the electrodes. Each electrode 9 is of tubular construction, being provided with an axial, vertical bore or channel 14 communicating at the upper end of the electrode with a gas supply pipe 15 connected to any suitable source of gas supply, the connection including a flexible hose 16 and valve means 17. Tap-holes 18 and 19 are provided, respectively, for the melted metal and for the slag.

My process may be carried out in the above described apparatus as follows:

The material to be treated consisting, for example, of iron sponge in which the iron is in only partially reduced condition and containing more or less oxidized iron and also generally containing more or less free carbon, is charged into the receptacle or crucible 3, as indicated at 20, when it is subjected to the heating action of an electric current. Current being supplied to the electrodes 9 arcs by suitable connections to a threephase alternating current circuit are formed at the lower ends of said electrodes, it being understood that sufficient conducting material is provided or retained at the bottom of the crucible or receptacle 3 to insure the production of such arcs. At the same time gas is supplied to the passages 14 in the electrodes and under the action of the heat produced at the arcs aforesaid and in the presence of the gas thus provided the iron sponge is fully reduced and melted to form a body of metallic iron or steel which accumulates in the crucible or receptacle 3. By supplying the material to be treated continuously the operation may be made continuous, but it is also possible to operate in batches, the crucible being charged as stated, and the material as it is reduced and melted being drawn off through the metal tap-hole 18 while the slag is drawn off through the slag tap-hole 19, and the charge gradually descending as it is used up in this manner. In this operation of the furnace there will be a body of melted metal in a zone, indicated at 23, at the bottom of the crucible or receptacle, and above this a body of melted slag, indicated at 24, and above this a body of unreduced material which gradually descends as the metal and slag flow out through the tap-holes aforesaid. Owing to the temperature there is a gradual wear or consumption of the electrodes but the passage of the comparatively cool gas through the electrodes helps to prolong the life of the electrodes by reducing the temperature and, on the other hand, the gradual wearing away or consumption of the electrodes at their lower ends prevents clogging of the gas passages.

By the operation above described it is practicable to produce iron in pure, decarburized condition, or by retaining the body of iron in the crucible in contact with the reducing gas (which preferably consists mainly of hydrocarbons, such as methane, ethane, etc.) the metal may be carburized to any desired extent.

The iron sponge used in the above described operation is preferably produced by subjecting oxidized iron ore to the action of a reducing gas, such as natural gas, oil gas, or producer gas, with suitable amounts of coke, or other form of free carbon, if desired, while maintained at such temperature as to cause partial reduction, but not such as to cause melting of the product, as set forth in an application for patent filed by me on May 12th, 1919, Serial No. 296,336, for "method and apparatus for the production of iron and steel." In general, this operation results in the production of an iron sponge containing partially reduced iron compound, together with some free carbon, or carburized iron. I have found that this operation can be carried out most economically when the reduction of the iron is such that the iron sponge contains more oxidized compound than could be reduced by the carbon in the sponge, the initial stages of reduction being easily and cheaply effected, whereas the final stage of reduction requires such prolonged heating and such high temperature as to seriously interfere with economical production. By charging the partially reduced sponge into an electric furnace and subjecting it to a higher temperature by the heating action of an electric current, and supplying reducing and carburizing gas to the sponge while so heated, I am enabled to fully reduce and melt the iron with maximum economy.

The furnace described may also be used for the reduction of iron ore, or of other metallic compounds, in similar manner.

The furnace may also be used to melt and carburize and siliconize iron scrap (turnings, etc.,) to make pig iron. The scrap is melted in the crucible with suitable flux to form a melted bath and slag, and the electrodes deliver the hydrocarbon gas below the slag and in contact with the melted metal, so as to carburize the metal and also to reduce silicon from the slag to introduce the required amount of silicon for making pig iron.

What I claim is:

1. The process which consists in subjecting iron sponge containing partially reduced iron compound to the heating action of an electrical current in such manner as to produce and maintain a body of melted metal and a body of slag above such metal, the electric current being maintained between said body of metal, and an electrode extending through said body of slag and directly over said body of metal and supplying reducing gas to the material below the surface of said body of slag and in the zone between said electrode and the body of metal while so heated so as to cause reduction of the iron to metallic state, and melting of the reduced metal.

2. The process which consists in subjecting iron sponge containing partially reduced iron compound to the heating action of an electrical current to produce a body of melted metal and an overlying body of slag and supplying reducing gas containing carbon adjacent to the body of melted metal and below the upper surface of the slag for a sufficient time to cause reduction, melting and carburizing of the iron.

3. The process which consists in subjecting material containing iron in at least partially oxidized form to the action of an alternating electrical heating current to produce a body of melted metal and a body of slag over said metal and supplying a reducing gas to the material while so heated, said reducing gas being applied directly to the material through which the current is passing and below the upper surface of said body of slag.

4. The process which consists in subjecting oxidized iron ore to the action of a reducing gas and of heat, to produce iron sponge containing partially reduced iron, and then subjecting such iron sponge to heating action at a higher temperature by the heating action of an electric current in such manner as to produce a body of melted metal and an overlying body of slag, and supplying reducing gas to the material while so heated to produce iron in reduced and melted condition said reducing gas being supplied below the surface of the slag and in contact with said body of metal.

In testimony whereof I have hereunto subscribed by name this 27th day of April 1920.

ELFEGO RIVEROLL.